(12) United States Patent
Rubitschung

(10) Patent No.: US 11,932,439 B2
(45) Date of Patent: Mar. 19, 2024

(54) FILLING DEVICE FOR TRANSFERRING FLOWABLE PROCESS MATERIAL BETWEEN A FIRST AND A SECOND CONTAINER IN A MANNER PROTECTED AGAINST CONTAMINATION

(71) Applicant: Rubitec AG, Bennwil (CH)

(72) Inventor: Christoph Rubitschung, Lampenberg (CH)

(73) Assignee: Rubitec AG, Bennwil (CH)

( * ) Notice: Subject to any disclaimer, the term of this patent is extended or adjusted under 35 U.S.C. 154(b) by 354 days.

(21) Appl. No.: 17/601,654

(22) PCT Filed: Mar. 20, 2020

(86) PCT No.: PCT/CH2020/000004
§ 371 (c)(1),
(2) Date: Oct. 5, 2021

(87) PCT Pub. No.: WO2020/198889
PCT Pub. Date: Oct. 8, 2020

(65) Prior Publication Data
US 2022/0177178 A1 Jun. 9, 2022

(30) Foreign Application Priority Data
Apr. 5, 2019 (EP) .................................... 19405006

(51) Int. Cl.
*B65B 69/00* (2006.01)
*B65G 69/18* (2006.01)
(52) U.S. Cl.
CPC ........ *B65B 69/0075* (2013.01); *B65G 69/183* (2013.01)
(58) Field of Classification Search
CPC .......................... B65G 69/183; B65B 69/0075
See application file for complete search history.

(56) References Cited

U.S. PATENT DOCUMENTS 10,800,567 B2 * 10/2020 Rubitschung ....... B65B 69/0075
2011/0258967 A1 * 10/2011 Dietrich, Jr. ........ B65B 69/0075
53/449

FOREIGN PATENT DOCUMENTS

CH 699603 A2 3/2010
DE 20105740 U1 6/2001
(Continued)

OTHER PUBLICATIONS

International Search Report of the International Searching Authority, along with an English translation, dated Jul. 13, 2020, issued in connection with International Application No. PCT/IB2020/000004 (5 pages).

(Continued)

*Primary Examiner* — Jason K Niesz
(74) *Attorney, Agent, or Firm* — McCarter & English, LLP

(57) ABSTRACT

A transfer device is designed for contamination-protected transfer of flowable process material between a first container and a second container. The transfer device includes a guide tube having an axial passage for the flow of the process material, which has a connection at one end and terminates with a tube edge at the other end. A transfer unit opens into the guide tube, which allows engagement with the guide tube. A tubular liner supply having a plurality of peelable useful sections, each provided with a first crimp, is stored on the transfer unit. The useful sections can be used to isolate liner remnants from previous transfer operations for disposal. A first tensioner and a second tensioner are arranged circularly on the guide tube and concentrically to each other, which serve for temporary sealed fixing of residual ends and open ends of new liner pieces originating from inner liners from the second containers.

9 Claims, 10 Drawing Sheets

(56) References Cited

FOREIGN PATENT DOCUMENTS

Figure 1:
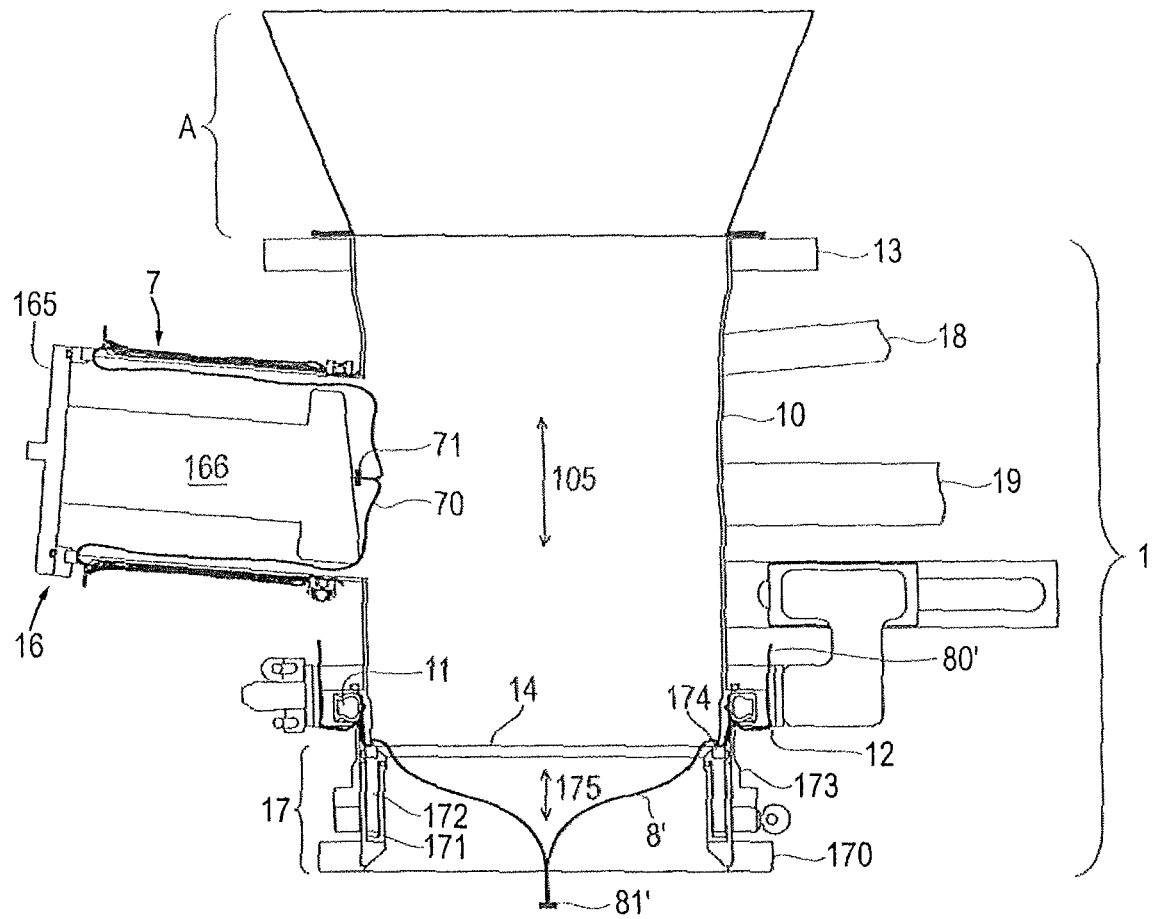
Figure 1:
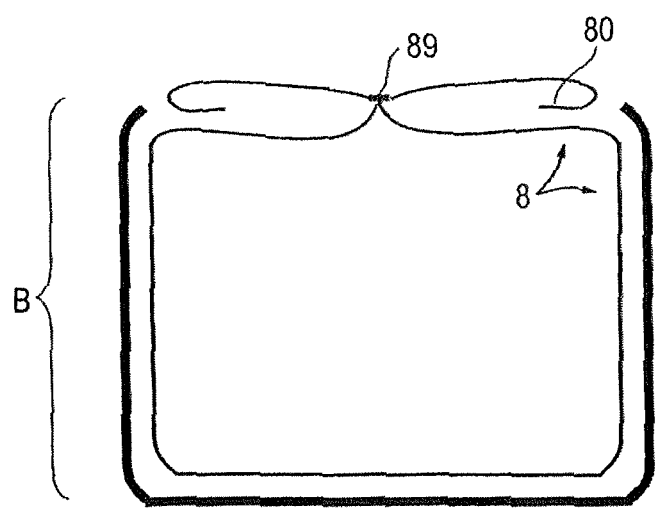

| EP | 1958900 A2 | 8/2008 |
| EP | 3000739 A1 | 3/2016 |
| EP | 3041749 A1 | 7/2016 |
| GB | 2292735 A | 3/1996 |
| WO | 2010/134102 A1 | 11/2010 |
| WO | 2013/050968 A1 | 4/2013 |

OTHER PUBLICATIONS

Written Opinion of the International Searching Authority, along with an English translation, dated Jul. 13, 2020, issued in connection with International Application No. PCT/IB2020/000004 (4 pages).
International Preliminary Report on Patentability dated Oct. 14, 2021, including an English translation of the Written Opinion of the International Searching Authority, dated Jul. 13, 2020, issued in connection with International Application No. PCT/IB2020/000004 (6 pages).

* cited by examiner

FILLING DEVICE FOR TRANSFERRING FLOWABLE PROCESS MATERIAL BETWEEN A FIRST AND A SECOND CONTAINER IN A MANNER PROTECTED AGAINST CONTAMINATION

RELATED APPLICATIONS

This application is a U.S. National Phase Application under 35 U.S.C. 371 of International Application No. PCT/CH2020/000004 filed Mar. 20, 2020, which claims the benefit of European Patent Application No. 19405006.8 filed on Apr. 5, 2019. The disclosures of these applications are incorporated herein by reference in their entireties.

FIELD OF APPLICATION OF THE INVENTION

The present invention relates to a transfer device for contamination-protected transfer of flowable process material between a first container and a second container. The transfer device has a guide tube through which the process material passes through an axial passage and which has a connection means at one end and terminates with a tube edge at the other end. A transfer unit opens into the guide tube, which allows engagement with the guide tube and on which is stored, from a tubular liner supply, at least one peelable useful section provided with a first crimp. A first tensioner has the temporary function of sealingly fixing a residual end of a liner remnant coming from a previous transfer operation, forming a bag shape, closed at the other end with a second crimp, or the free open end of the new liner piece. A second tensioner, arranged circularly on the guide tube and concentric to the first tensioner, has the temporary function of sealingly fixing the residual end or the free end of the new liner piece. The new liner piece leads as a bag-shaped inner liner into the second container, which can be a big bag, a drum or a container, while the first container is a drum or container or part of a production line and is directly sealed to the guide tube. The process material may be of a sensitive nature—e.g. a pharmaceutical component—and must not be contaminated by the external environment or enter the environment.

DESCRIPTION OF THE PRIOR ART

The subject matter of CH 699 603 A2 is a method and an associated device for low-contamination transfer of filling material from a first container into a second container. The first container has an enclosure which opens into an outlet which is provided with a first closure. A flexible extension extends beyond the first closure as a continuation of the enclosure. A filling device comprising a tube is disposed between the first container and the second container. The tube is intended for flow of the filling material during transfer from the first container to the second container and, on its outer circumference, for storing a film-shaped continuous liner. A second sealing point is formed by an arrangement comprising an activatable seal, a flexible extension of the film passed over the outer periphery of the seal, a flexible extension of the enclosure passed externally over the flexible extension of the film in the region of the seal, and a first tensioning element applied externally over the flexible extension in the region of the seal.

EP 1 958 900 B1 discloses a method for emptying a liner connected to a first container. The device used for this purpose has a chamber-shaped guide tube and an upper opening through which the first container can be emptied into the guide tube. The process material flows through the lower opening into a second container. A first fastening device is provided at the upper opening for fastening the liner. A sealing flange allows the liner to be attached to the opening in a sealed manner, wherein a lever serves to lift the sealing flange off and onto the opening. The guide tube has an engagement with a second fastening device for a film bag or continuous tubular film. On the first fastening device, two tensioners are provided, which are running circularly around the guide tube and are located one below the other, in which the free ends of the liner or a liner remnant from the previous refilling operation are fixed. The second fastening device has two tensioners running circularly around the guide tube and lying next to each other, which serve to fix an outwardly closed liner bag or a second liner remnant closed with a crimp. During the transfer process, after the second and then the first liner remnants have been ejected, it is necessary to rehang the film bag on the second fastening device and the liner on the first fastening device. This handling is somewhat awkward and causes the system to be opened twice, which is not uncritical.

WO 2013/050 968 A1 relates to a method for contamination-preventing filling of a container with a sleeve-shaped connection area, wherein a sleeve connection is created between the connection area and a transfer sleeve. For this purpose, a mounting ring is provided and the free end portion of the connection portion is passed through the mounting ring. Then, the free end portion of the terminal portion is folded around the mounting ring. The first end of the transfer sleeve is slipped over the folded-over end portion of the connection portion of the container and the mounting ring. A fixing element is now provided to fix the transfer sleeve to the connection area of the container. After the sleeve connection is made, the second end of the transfer sleeve is arranged on a filling nozzle of a container, and then the container is filled. A clamping device is used to carry out the method.

In WO 2010/134 102 A1, a device and an associated method are proposed for discharging a powder product from a storage container through a feed-through tube into a receiving container. A tubular liner piece is connected at the top to the outlet opening of the storage container and at the bottom by means of a fastening unit framing the inlet opening of the passage tube. The intermediate part of the liner piece bridging the outlet opening and the inlet opening has glove engagements. The fastening unit consists of an upper fixed bracket and a lower bracket arranged below it, which can be pushed axially towards the upper bracket. Depending on the operating phase, suction openings are used to temporarily fix the currently stretched liner piece together with a separated liner remnant closed at the top by means of negative pressure in one or both brackets. The liner remnant then released by the fixing unit can be discharged via the glove engagements of the current liner piece. During the discharge process, the current liner piece is additionally pressed onto the edge of the inlet opening by means of a clamping ring.

Finally, EP 3 041 749 B1 relates to a device for transferring process material between a first container and a second container. Provided is at least one tensioning unit comprising a first tensioner and a second tensioner which are operable independently of each other. The at least one clamping unit is intended to temporarily fix in a sealed manner:

only one end section, facing the clamping unit in question, of a tubular liner piece extending indirectly between the containers to seal the transition between the containers to the outside;

only one end section, facing the clamping unit in question, of a tubular liner remnant originating from a previous transfer operation and closed at the other end with a first crimp; and the one end section of the liner piece at the same time as the one end section of the liner remnant coming from a previous refilling operation, wherein:

both tensioners of the respective tensioning unit are intended to temporarily fix together in a sealed manner the facing end section of the liner piece or together the facing end section of the liner remnant originating from a previous refilling process. Both tensioners of the respective tensioning unit are arranged circularly and concentrically to each other in relation to the longitudinal extension of the liner piece.

OBJECT OF THE INVENTION

In relation to previously known devices and practiced methods, the invention is based on the object of creating a transfer device for contamination-protected transfer of flowable process material between a first and a second container with further improved tightness.

SUMMARY OF THE INVENTION

The transfer device for contamination-protected transfer of flowable process material between a first container and a second container has a guide tube through whose axial passage the process material flows. Connection means are provided on the guide tube at one end and a terminating tube edge at the other end. The transfer device also includes a transfer unit which opens into the guide tube, allows engagement with the guide tube and on which at least one removable useful section provided with a first crimp is stored from a tubular liner supply.

A first tensioner has the function to fix in a temporarily sealed manner:
  a residual end of a liner remnant from a previous transfer operation, forming a bag shape, sealed at the other end with a second crimp; or
  a free open end of a new liner piece that leads into the second container as a bag-shaped inner liner.

A second tensioner, arranged circularly on the guide tube and concentric to the first tensioner, has the function of temporarily sealing the residual end or the free end of the new liner piece.

A further essential component of the transfer device is a pressing unit which can be moved axially along the length of the guide tube on a lifting linkage and has an axial passage to temporarily accommodate the liner remnant and/or the new liner piece internally. The pressing unit has a seal which has the temporary function of sealingly fixing only the residual end resting against the tube edge or said residual end together with the free end of the new liner piece resting against it or only the free end of the new liner piece resting against the tube edge. A base part of the pressing unit is firmly connected to the lifting linkage, and a pressing part, on which the seal is arranged, is elastically supported on the base part by means of a spring.

Particularly advantageous details of the transfer device are given below: The pressing unit further comprises an activatable plug element, which serves to fold the free end of the new liner piece into the first tensioner in loop form.

The lifting linkage is designed, by moving the base part, to move the seal located on the pressing part, depending on the working phase of the transfer device:
  in its entirety away from the tube edge to insert the free end of a new liner piece through the axial passage of the pressing unit into the second tensioner; or
  to fix, by using only moderate pressure, the free end of the new liner piece lying against the tube edge in a sealed manner; or
  to fix, by using only moderate pressure, the residual end resting against the tube edge together with the free end of the new liner piece resting against it in a sealed manner, so that a residual end which has already been released from the second tensioner and is now only clamped in the first deactivated tensioner can be pulled out; or
  to fix, by using maximum pressure, the residual end lying against the tube edge or the free end of the new liner piece lying against the tube edge in a sealed manner.

The maximum length of travel of the spring can be adjusted on the pressing unit, e.g. by means of adjustable stops. The function of at least one of the two tensioners is based on inherent elasticity or external control. The first tensioner is designed as an inflatable seal that can be activated by media pressure or has inherently elastic clamping jaws. The second tensioner is designed as a clamp which is constricted in the closed state and expanded in the open state and has a manually actuated closure.

The useful section lies in the transfer unit until it is used, with its first crimp towards the mouth in the guide tube. The useful section is advanced towards the mouth by a plug which can be inserted into the transfer unit from the outside. The plug can be pulled out of the transfer unit and is connected to an advanceable cover. The transfer unit is designed in the form of a side stub extending from the guide tube and opens at an incline with a through opening into a wall of the guide tube.

The useful section drawn from the liner supply for use can be introduced into the axial passage of the guide tube by the transfer unit. This useful section is designed to:
  first grip the liner remnant from a previous decanting operation, which only hangs sealed in the first deactivated tensioner and between the tube edge and the free end of a new liner piece, sealed by the moderately pressing seal of the pressing unit, to sheath said liner remnant in an isolated manner and to transfer it to the outside; and finally
  to provide said useful section, in the state completely extracted from the transfer unit with the liner remnant contained therein, apart from the enclosed liner remnant, with a new first crimp as well as a third crimp close thereto, in order to separate and dispose of the used useful section with the liner remnant between the crimps; whereby
  a new useful section with a new first crimp is created, which can be brought into the initial position by means of the plug and is thus available for a next transfer operation.

The first container is directly connected in a sealed manner to a connection means of the guide tube of the transfer device and is a container or a component of a production plant, wherein process material is to be transferred from the first container to the second container, or the first container is to be charged with process material from the second container, guided through the transfer device. On the other hand, the second container has the shape of a big bag or a container, which contains a liner piece as a bag-shaped inner liner, wherein process material is to be transferred from the second container to the first container or the second container is to be charged with process material from the first container, guided by the transfer device.

BRIEF DESCRIPTION OF THE ATTACHED DRAWINGS

Figure 2:
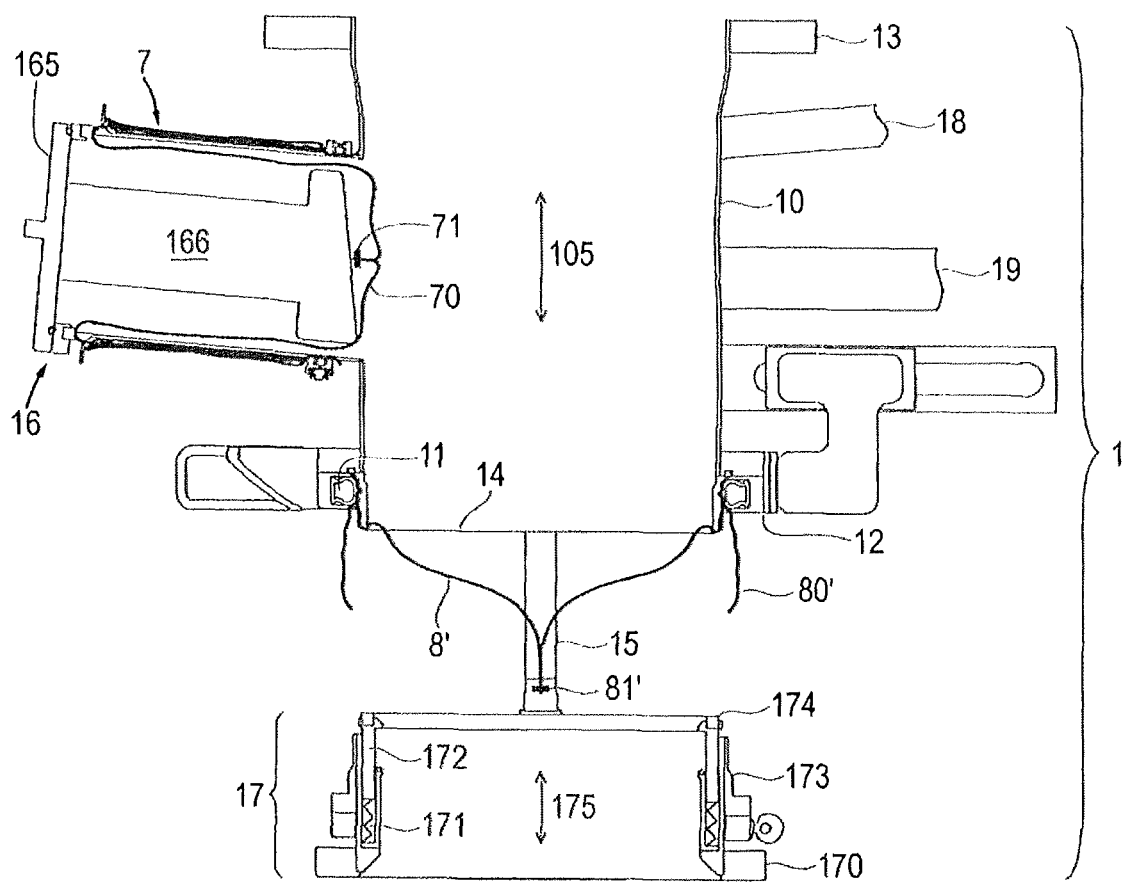
Figure 3:
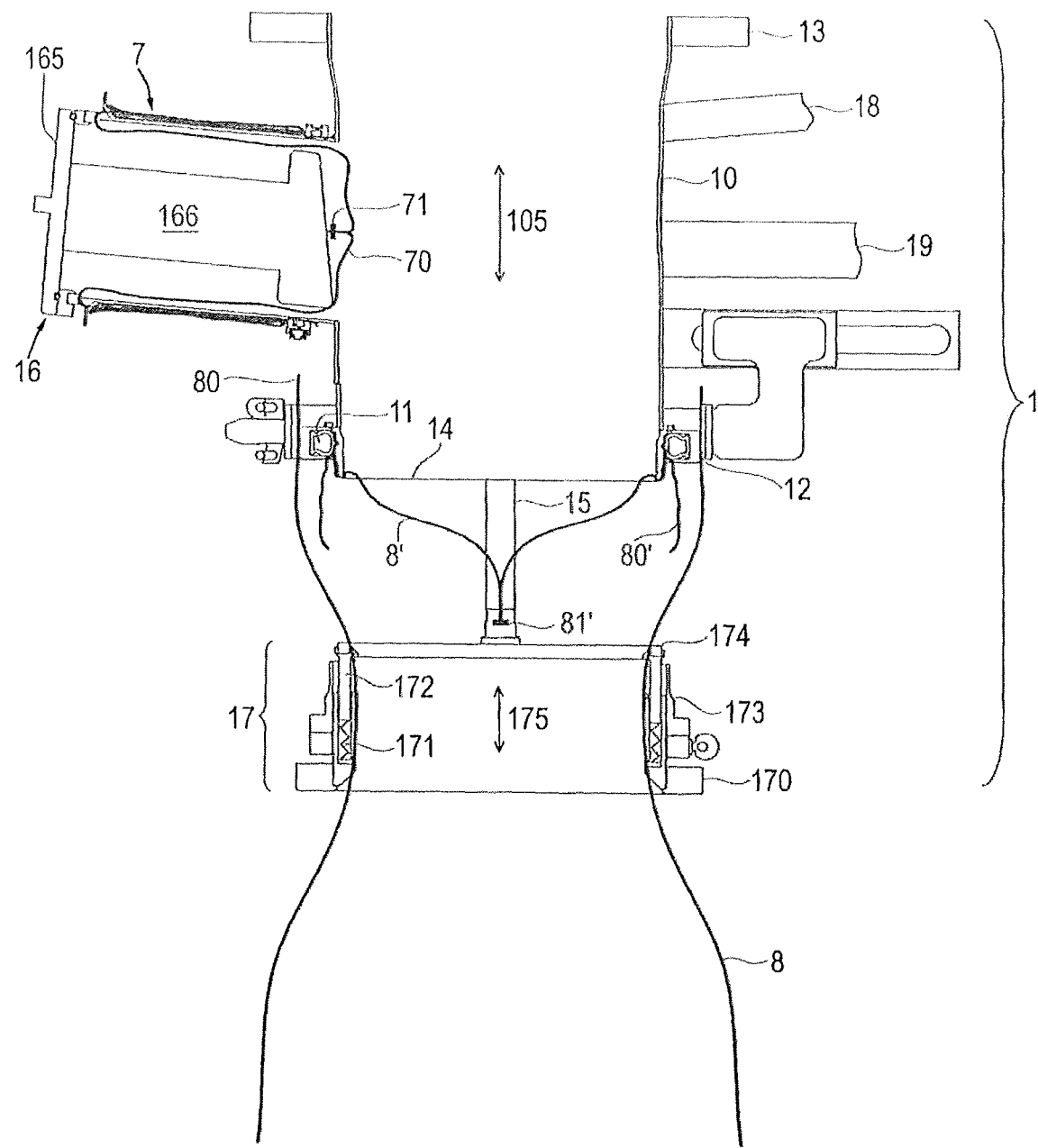
Figure 4:
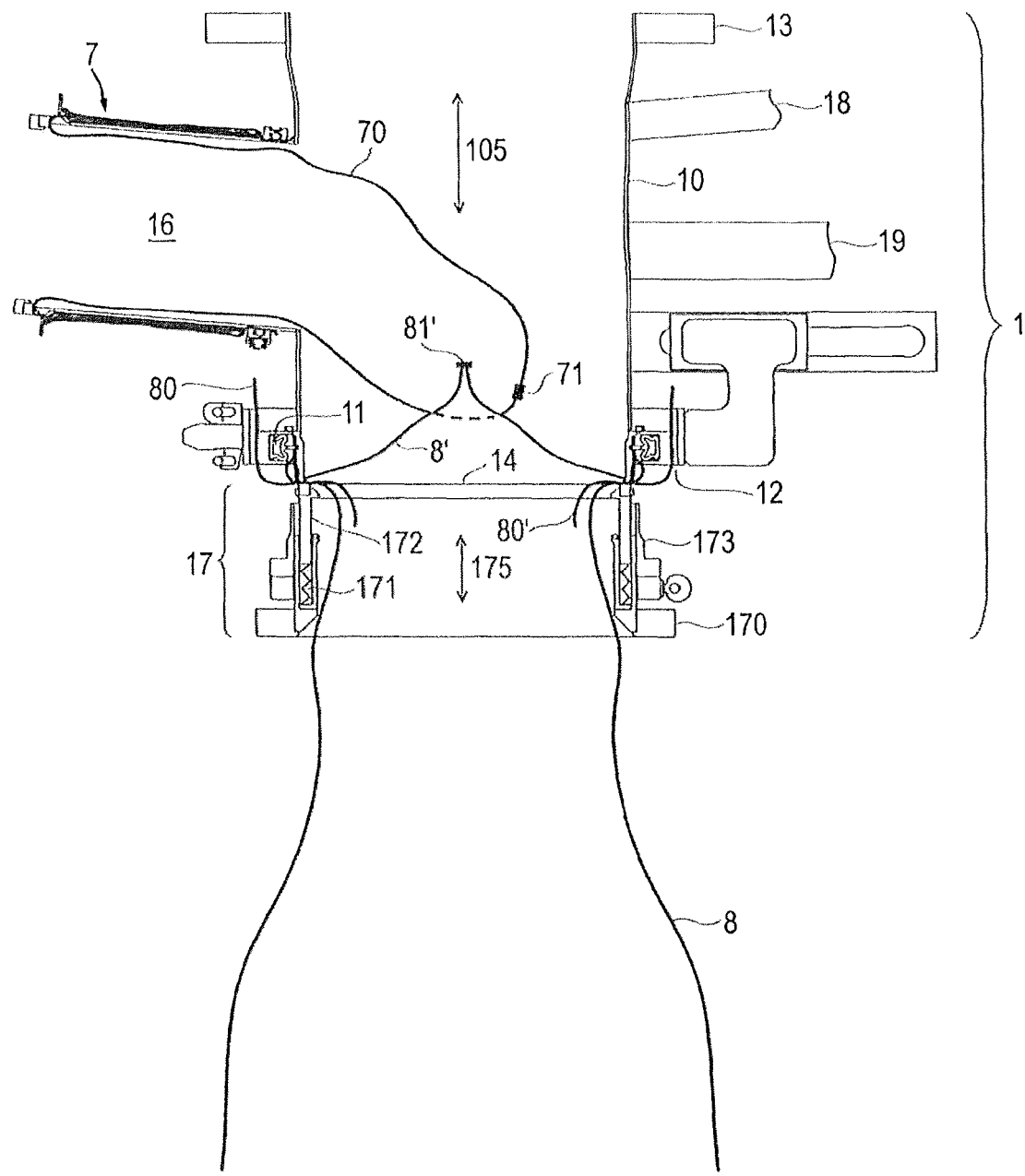
Figure 5:
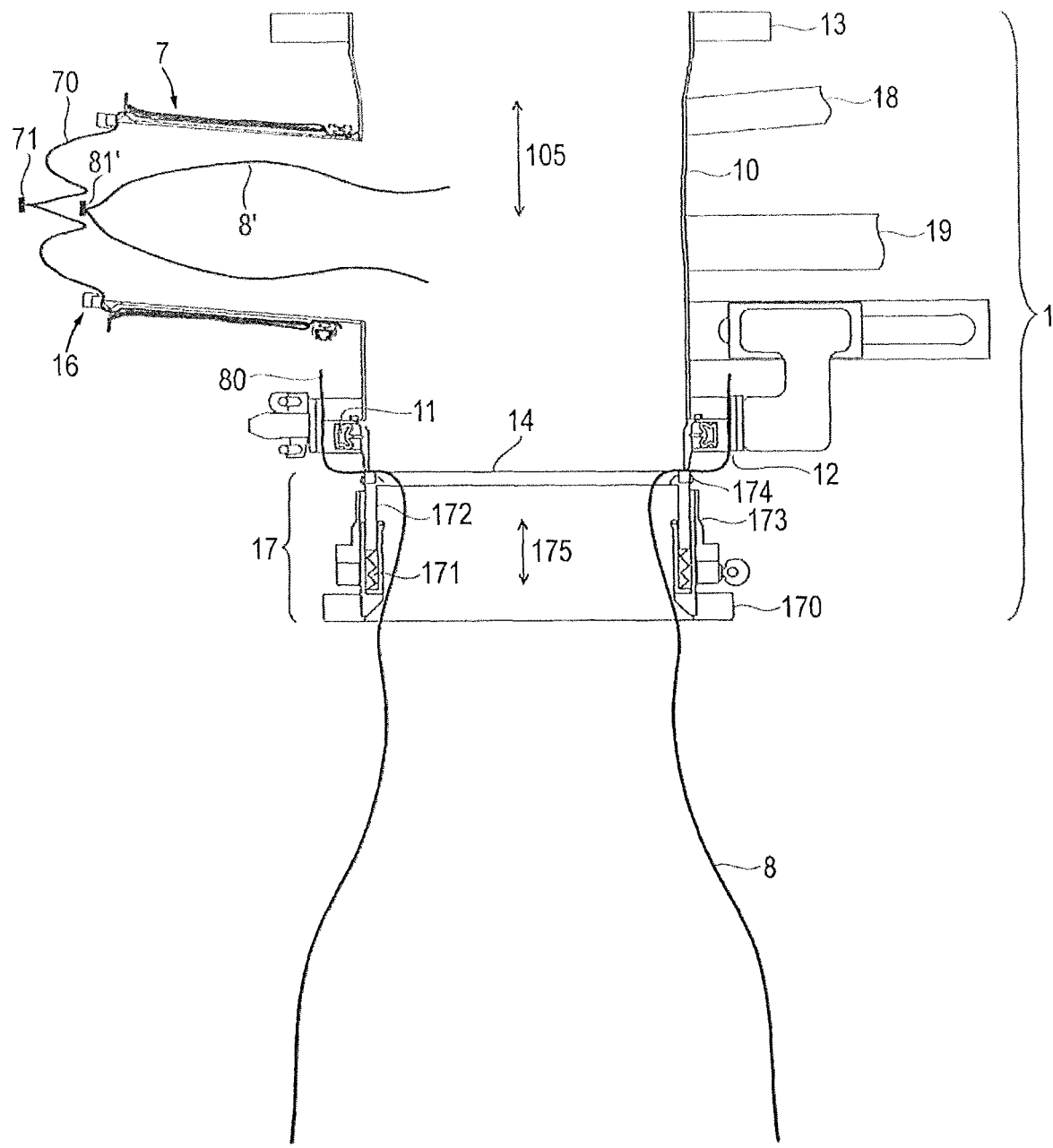
Figure 6A:
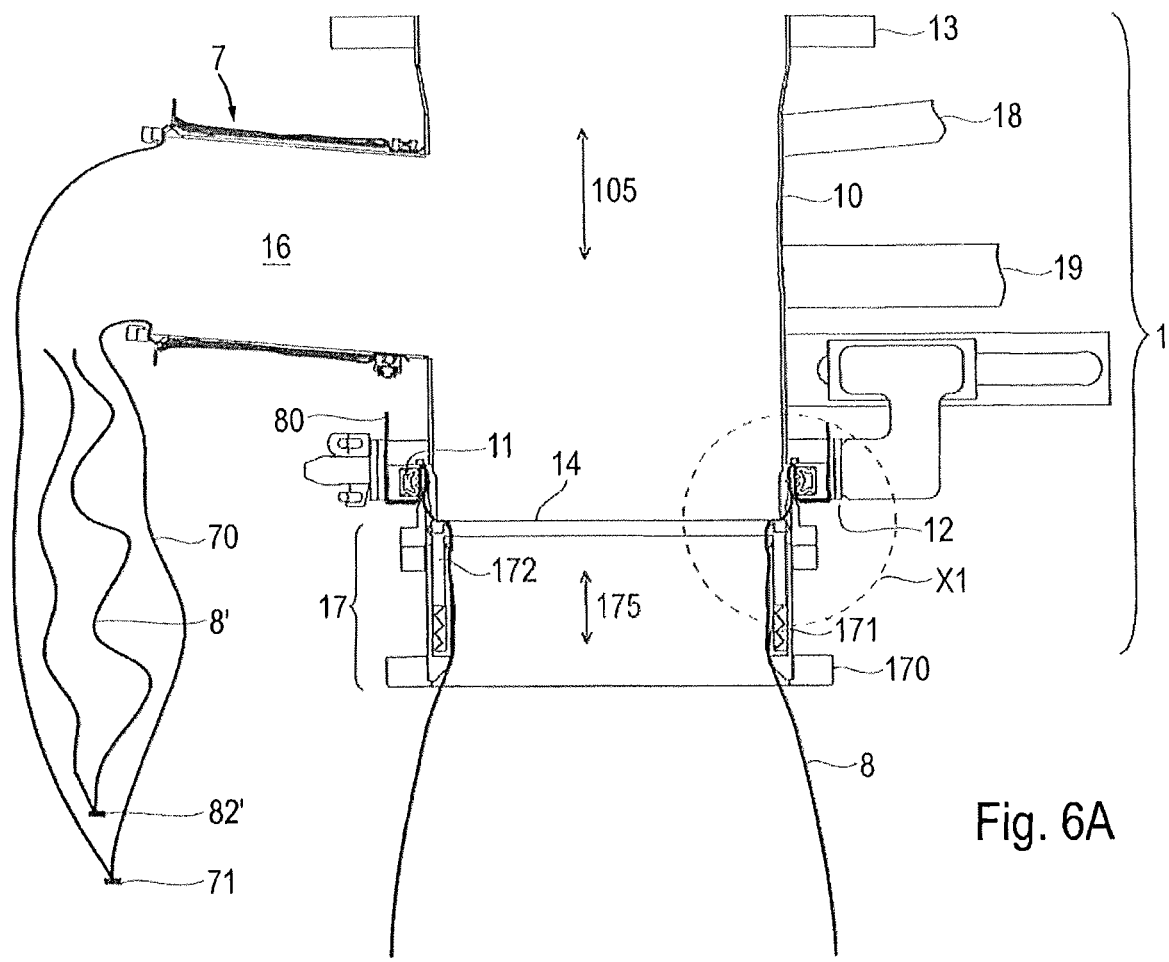
Figure 6B:
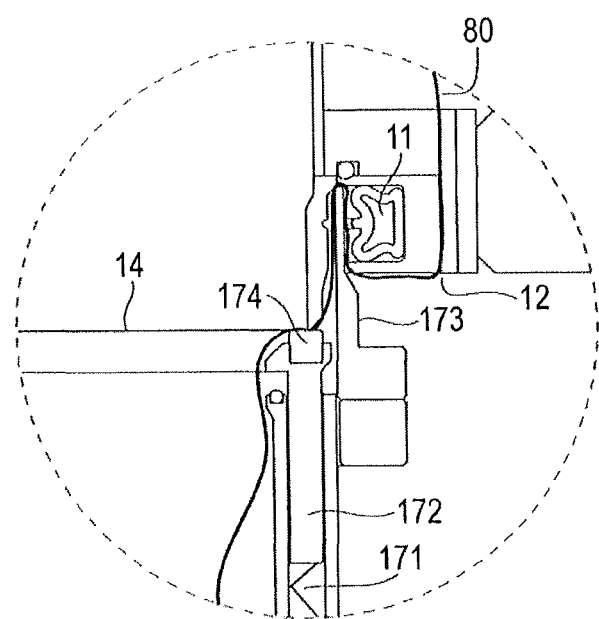
Figure 7A:
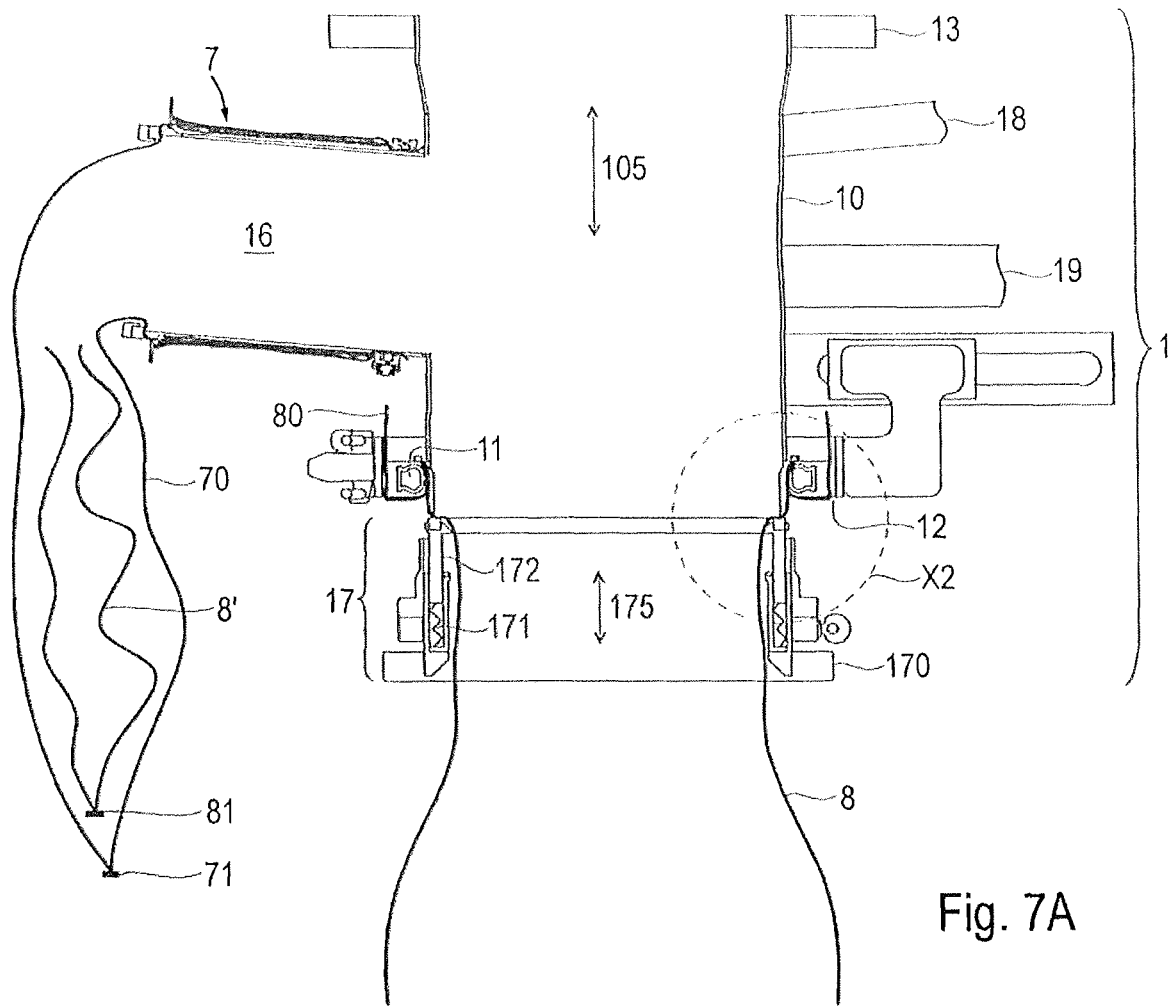
Figure 7B:
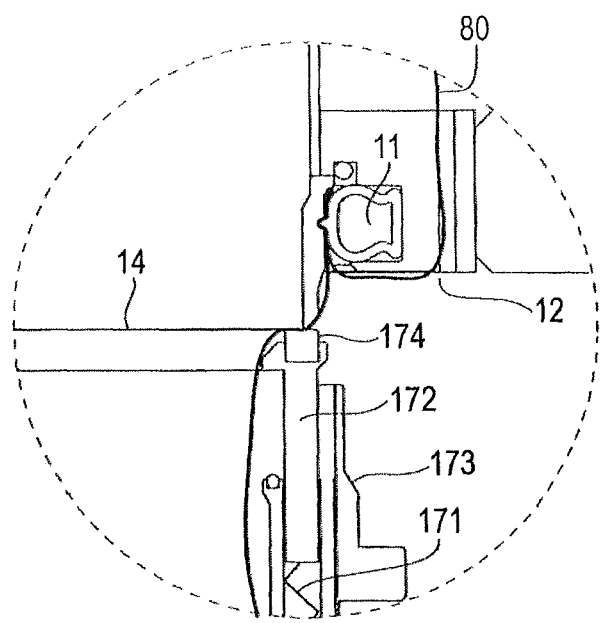
Figure 8A:
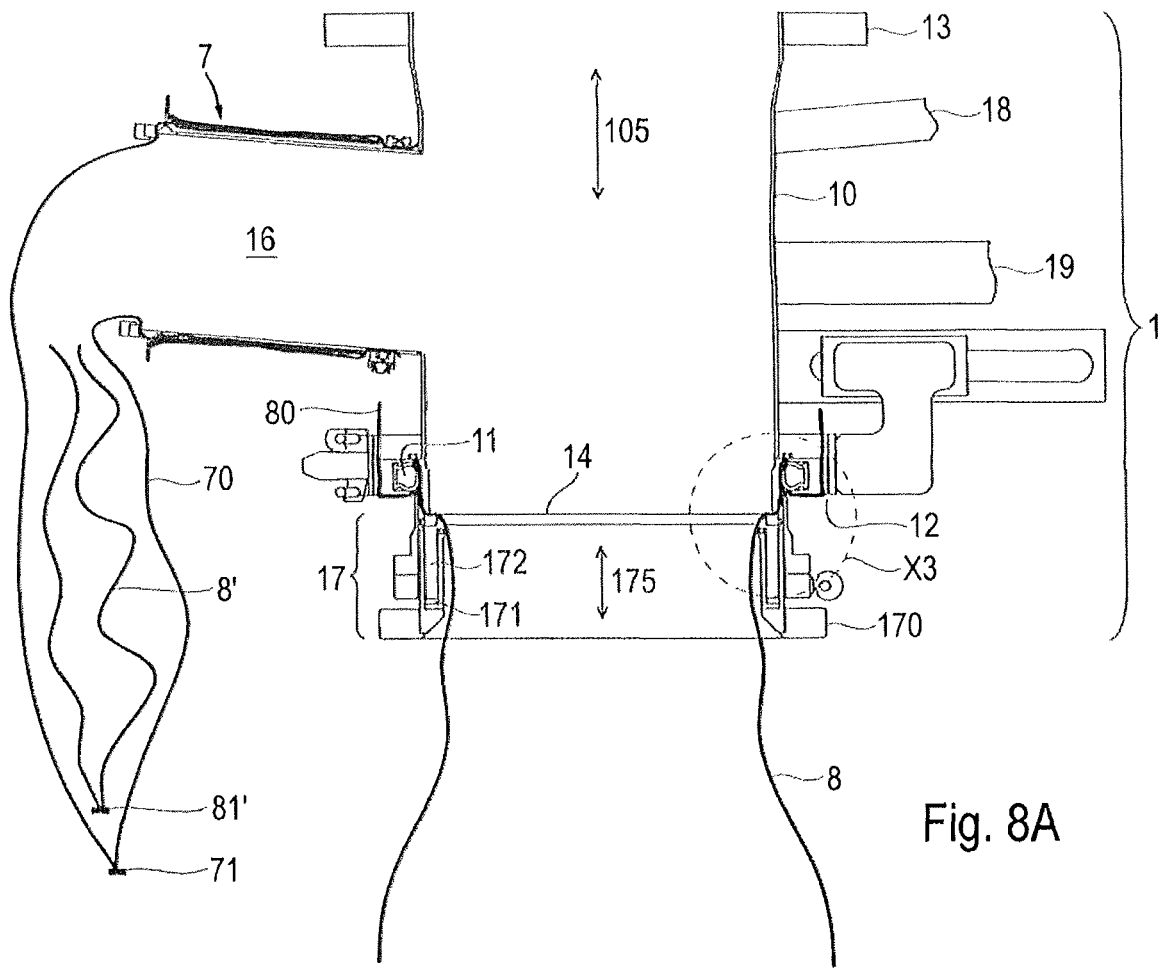
Figure 8B:
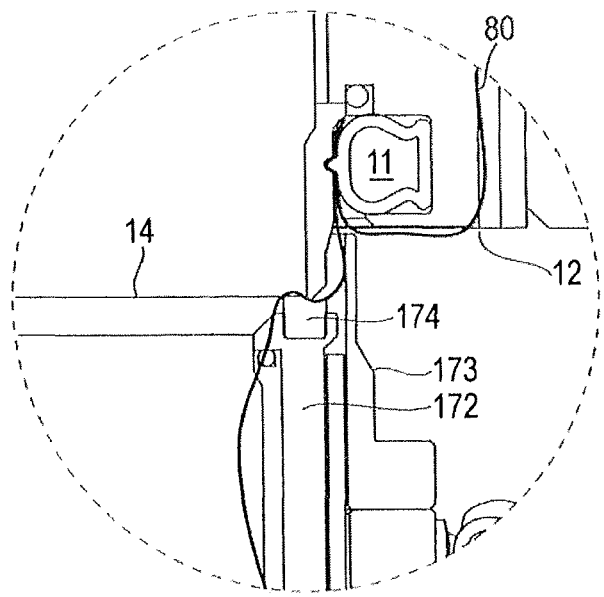
Figure 9:
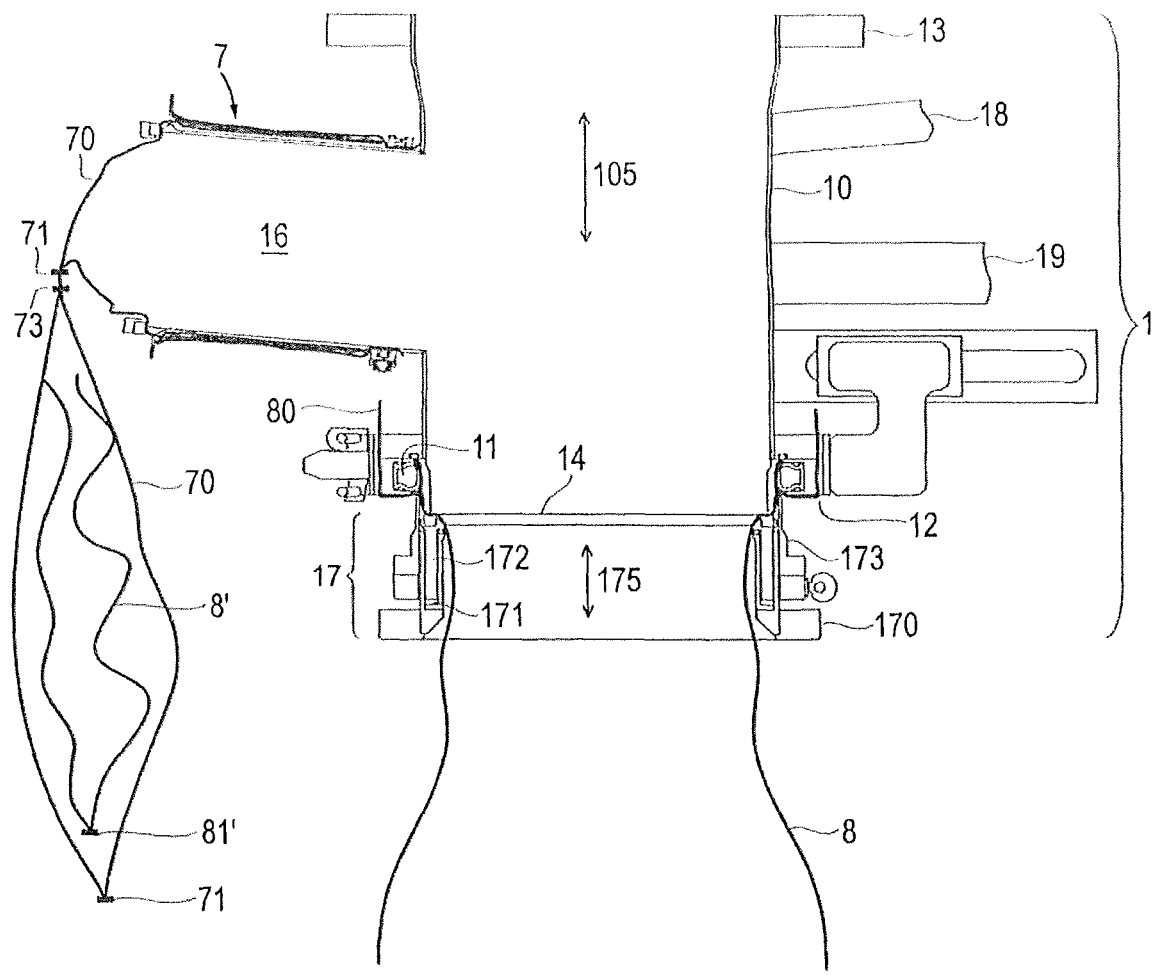
Figure 10:
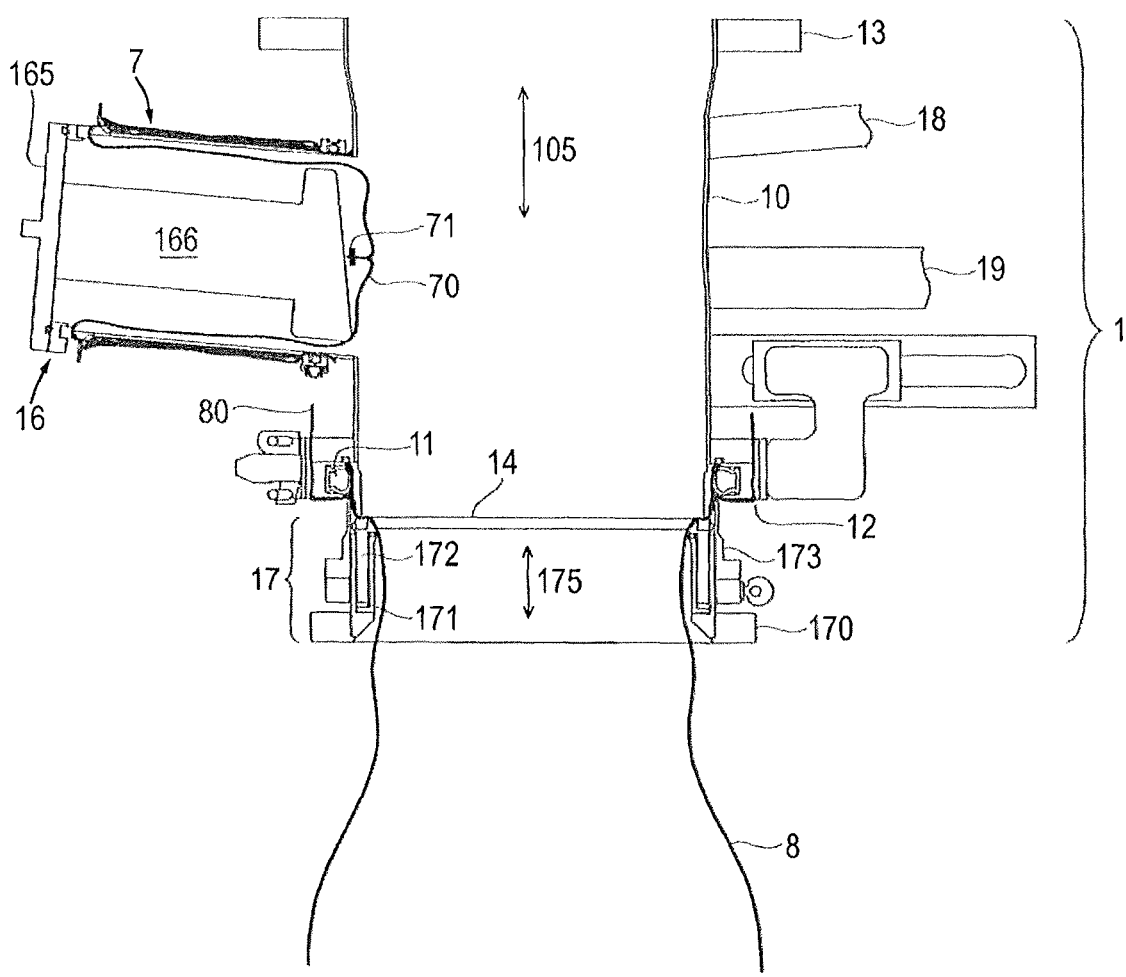

The following schematic diagrams show the design of the transfer device and its successive functional sequence:

FIG. 1—First phase with device setup and final situation of a transfer operation
FIG. 2—Second phase
FIG. 3—Third phase
FIG. 4—Fourth phase
FIG. 5—Fifth phase
FIG. 6A—Sixth phase
FIG. 6B—The enlarged detail X1 from FIG. 6A
FIG. 7A—Seventh phase
FIG. 7B—The enlarged detail X2 from FIG. 7A
FIG. 8A—Eighth phase
FIG. 8B—The enlarged detail X3 from FIG. 8A
FIG. 9—Ninth phase; and
FIG. 10—Tenth phase with start situation of a new transfer process

EXEMPLARY EMBODIMENT

With reference to the enclosed drawings, the following is a detailed description of an exemplary embodiment of the transfer device according to the invention and its successive operation in the working mode.

The following stipulation applies to the entire further description. If reference signs are included in a figure for the purpose of graphic clarity, but are not explained in the directly associated descriptive text, reference is made to their mention in preceding figure descriptions. In the interest of clarity, the repeated designation of components in subsequent figures can sometimes be dispensed with, provided that it is clearly recognizable from the drawing that these are "recurring" components.

FIG. 1: Device Setup—First Phase—End of a Transfer Process

The exemplary embodiment assumes that a process material, in the form of flowable solids, is introduced from the first container A into a second container B by means of the transfer device 1 in a contamination-protected manner. The first container A is connected in a directly sealed manner to a connection means 13 of the guide tube 10 of the transfer device 1 and is a container or a component of a production plant. The second receptacle B has the shape of a big bag or a container, which contains a liner piece 8 as a bag-shaped inner liner, the free end 80 of which is usually provided with a closure 89 before the start of a transfer process. The conveying direction could alternatively extend from the second container B to the first container A. The axial passage 105 extending through the guide tube 10 allows the flow of the process material. At the outlet end, the guide tube 10 terminates with a tube edge 14. An inert gas line 13 leads to the guide tube 10 for charging with inert gas if required by the special process material, as well as a washing agent line 19 for cleaning the device 1.

A transfer unit 16 opens into the guide tube 10, which allows engagement with the guide tube 10 and on which a plurality of peelable useful sections 70, each provided with a first crimp 71, are stored by a tubular liner supply 7. The current useful section 70 lies in the transfer unit 16 and with its first crimp 71 towards the mouth until it is used, and is advanced towards the mouth by a plug 166 which can be inserted into the transfer unit 16 from the outside. The plug 166 is withdrawable from the transfer unit 16 and is connected to an advanceable cover 165. The transfer unit 16 is in the form of a side stub extending from the guide tube 10 and opens at an incline with a through opening into the wall of the guide tube 10.

A first tensioner 11, here in the form of an inflatable seal activated momentarily from the outside, fixes the folded-in remnant end 80' of a liner remnant 8' originating from a previous refilling process in a sealed manner. From the first tensioner 11, the remnant end 80' extends to the second tensioner 12, where it is also currently clamped in a tightly sealed manner. The second tensioner 12 is, for example, in the form of a clamp which is narrowed in the closed state and widened in the open state and has a manually operable closure.

The liner remnant 8' passes under the tube edge 14 and, provided at the bottom with the closing second crimp 81', hangs in the form of a sack in the axial passage 175 of a pressing unit 17. The base part 170 of the pressing unit 17 is firmly connected to a lifting linkage 15 (see FIG. 2), on which the pressing part 172 is elastically supported by means of an adjustable spring 171. The pressing unit 17 further has an activatable plug element 173, which serves to fold the free end 80 of a new liner piece 8 into the first tensioner 11 in loop form (see FIGS. 6A and 6B). At the present stage, the plug element 173 is in a retracted position, thus does not act into the first plug 11. The base part 170 is maximally approached to the guide tube 10, so the liner remnant 8' is pressed tightly in a sealing manner against the tube edge 14 of the guide tube 10 by the seal 174 arranged on the pressing part 172. The spring 171 is compressed and thus the compressive force exerted via the lifting linkage 15 additionally acts on the seal 174.

FIG. 2: Second Phase

The first tensioner 11 remains activated, and the pressing unit 17 has moved away from the guide tube 10. In the process, the spring 171 has relaxed to the maximum, so the press ring 172 pushes out of the base part 170. The second tensioner 12 is released, so that the residual end 80' of the liner remnant 8' previously clamped there can be pulled out and now hangs down freely.

FIG. 3: Third Phase

With the first tensioner 11 still activated and the spaced position of the pressing unit 17 maintained, a new liner piece 8 is inserted through the pressing unit 17 into the open second tensioner 12. The second tensioner 12 is then closed.

FIG. 4: Fourth Phase

The residual end 80' and the new liner piece 8 are guided around the tube edge 14. The base part 170 of the pressing unit 17 has moved up to a clamping position against the guide tube 10, so that the seal 174 arranged on the pressing part 172 presses the residual end 80' and the new liner piece 8 thus now only moderately against the tube edge 14 by the force of the spring 171. Now the first tensioner 11 can be released, while the second tensioner 12 remains firmly closed. The cover 165 together with the plug 166 are removed from the transfer unit 17. By means of the current useful section 70 advanced from the liner supply 7 into the guide tube 10, the liner remnant 8' is gripped.

FIG. 5: Fifth Phase

With the position of the pressing unit 17 maintained and the pressure of the seal 14 on the clamping point against the tube edge 14 still only moderate, the gripped liner remnant 8' together with the second crimp 81' are pulled out of the released first tensioner 11 and out of the clamping point on the seal 14 by means of the useful section 70 and drawn into the transfer unit 16. Thus, the useful section 70 with the first crimp 71 present thereon begins to emerge from the transfer unit 16. The second tensioner 12 remains closed so that the clamped end 80 of the new liner piece 8 remains tightly sealed and is not pulled out with it under any circumstances.

FIGS. 6A and 6B: Sixth Phase

The useful section 70 and the liner remnant 8' surrounded by it are completely pulled out of the transfer unit 16. With the aid of the advanced plug element 173 of the pressing unit 17, the end 80 of the new liner piece 8 is folded into the first released tensioner in a loop shape. The position of the pressing unit 17 remains unchanged, i.e. only moderate pressure is applied to the seal 14. The necessary length of material to be fed for the folding in at the end 80 of the new liner piece 8 is available on the section between the seal 174 and the closed second tensioner 12. While the plug element 173 is still in the advanced folding-in position, the first tensioner 11 is already moderately activated to ensure that the folding-in of the end 80 in the first tensioner 11 is not pulled out with it when the plug element 173 is retracted.

FIGS. 7A and 7B: Seventh Phase

Now the first tensioner 11 is also fully activated and thus firmly closed. The plug element 173 is in the retracted position. The setting of the previously moderate contact pressure of the seal 14 can still be maintained.

FIGS. 8A and 8B: Eighth Phase

Both tensioners 11, 12 are closed. The base part 170 of the pressing unit 17 is moved as close as possible to the guide tube 10, so that the new liner piece 8 is pressed in a tightly sealing manner against the tube edge 14 of the guide tube 10 by the seal 174 arranged on the pressing part 172. The spring 171 is compressed and thus the pressure force exerted via the lifting linkage 15 also acts on the seal 174.

FIG. 9: Ninth Phase

The settings on the tensioners 11, 12 and the position of the contact pressing unit 17 for generating the fixed contact pressure of the seal 14, as shown in FIG. 8 according to the eighth phase, remain unchanged. A new first crimp 71 and, close to it, a third crimp 73 are applied to the useful section 70, which is completely withdrawn from the transfer unit 16, with the liner remnant 8' contained therein, and are cut off between them in order to dispose of the useful section 70 and the liner remnant 8'.

FIG. 10: Tenth Phase—Start of a New Transfer Process

By pushing the plug 166 into the transfer unit 16, a new useful section 70 is brought into position and, at the same time, the lid 165 is placed on to close the transfer unit 16. A new transfer process can now be started.

The invention claimed is:

1. A transfer device for contamination-protected transfer of flowable process material between a first container and a second container, comprising:
   a) a guide tube having an axial passage for the flow of the process material, which has a connection means at one end and terminates with a tube edge at the other end;
   b) a transfer unit opening into the guide tube, which transfer unit permits engagement in the guide tube and on which at least one peelable useful section provided with a first crimp is stored from a tubular liner supply;
   c) a first tensioner with the temporary function to fix in a sealed manner:
      ca) a residual end of a liner remnant coming from a previous transfer operation, forming a bag shape, is closed at the other end with a second crimp; or
      cb) a free open end of a new liner piece leading into the second container (B) as a bag-shaped inner liner;
   d) a second tensioner, arranged circularly on the guide tube and concentric to the first tensioner, with the temporary function to fix in a sealed manner:
      da) the residual end; or
      db) the free end of the new liner piece; and
   e) a pressing unit which can be moved axially in accordance with the longitudinal extension of the guide tube on a lifting linkage and comprises an axial passage for temporarily receiving the liner remnant and/or the new liner piece internally, and a seal which has the temporary function, to fix in a sealed manner solely the residual end resting against the tube edge or said residual end together with the free end of the new liner piece resting thereon or solely the free end of the new liner piece resting against the tube edge, wherein
   f) the pressing unit has a base part firmly connected to the lifting linkage and a pressing part elastically supported on the base part by means of a spring and having the seal arranged thereon.

2. The transfer device according to claim 1, wherein the pressing unit further comprises an activatable plug element which serves to fold the free end of the new liner piece into the first tensioner in loop form.

3. The transfer device according claim 1, wherein the lifting linkage is designed to move the seal arranged on the pressing part by moving the base part, depending on the working phase of the transfer device:
   a) completely away from the tube edge in order to insert the free end of a new liner piece through the axial passage of the pressing unit into the second tensioner; or
   b) to fix, by only using moderate pressure, the free end of the new liner piece lying against the tube edge in a sealed manner; or
   c) to fix, by only using moderate pressure, the residual end resting against the tube edge together with the free end of the new liner piece lying thereon in a sealed manner, so that a residual end already released from the second tensioner and only clamping in the first deactivated tensioner can be pulled out; or
   d) to fix, by using maximum pressure, the residual end lying against the tube edge or the free end of the new liner piece lying against the tube edge in a sealed manner.

4. The transfer device according to claim 1, wherein the maximum length of the travel of the suspension can be adjusted on the pressing unit.

5. The transfer device according to claim 1, wherein:
   a) the useful section drawn from the liner supply for use can be introduced into the axial passage of the guide tube by the transfer unit; and
   b) said useful section is designed to:
      ba) first grip the liner remnant originating from a previous transfer operation, which liner remnant hangs in an extractable manner only in the first deactivated tensioner and between the tube edge and the free end of a new liner piece sealed by the moderately pressing seal of the pressing unit, to sheath said liner remnant in an isolated manner and to transfer it to the outside; and finally
      bb) to provide said useful section, in the state completely pulled out of the transfer unit with the liner remnant contained therein, away from the enclosed liner remnant, with a new first crimp as well as a third crimp close thereto, in order to separate and dispose of the used useful section with the liner remnant between the crimps; whereby c) a new useful section with a new first crimp is formed, which can be brought into the initial position by means of the plug and is thus available for a next transfer operation.

6. The transfer device according to claim 1, wherein:
a) the first container is directly connected in a sealed manner to a connection means of the guide tube of the transfer device and is a container or a component of a production plant, wherein guided by the transfer device, process material is to be transferred from the first container to the second container or the first container is to be charged with process material from the second container; and on the other hand
b) the second container is in the form of a big bag or a container which contains a liner piece as a bag-shaped inner liner, wherein, guided through the transfer device, process material is to be transferred from the second container to the first container or the second container is to be charged with process material from the first container.

7. The transfer device according to claim 1, wherein the function of at least one of the two tensioners is based on inherent elasticity or external control.

8. The transfer device according to claim 7, in that wherein:
a) the first tensioner is designed as an inflatable seal which can be activated by media pressure or has inherently elastic clamping jaws; and
b) the second tensioner is in the form of a clamp which is narrowed in the closed state and widened in the open state and which has a manually operable closure.

9. The transfer device according to claim 1, wherein:
a) the useful section lies in the guide tube up to its use in the transfer unit and with its first crimp towards the mouth and is advanced towards the mouth by a plug which can be inserted into the transfer unit from the outside;
b) the plug can be pulled out of the transfer unit and is connected to a cover which can be placed in front;
c) the transfer unit is formed in the shape of a side stub extending from the guide tube and opens at an incline with a through opening into a wall of the guide tube.

* * * * *

UNITED STATES PATENT AND TRADEMARK OFFICE
CERTIFICATE OF CORRECTION

| | | |
|---|---|---|
| PATENT NO. | : 11,932,439 B2 | |
| APPLICATION NO. | : 17/601654 | |
| DATED | : March 19, 2024 | |
| INVENTOR(S) | : Rubitschung | |

It is certified that error appears in the above-identified patent and that said Letters Patent is hereby corrected as shown below:

In the Claims

Column 10, Line 4, delete the words "in that"

Signed and Sealed this
Fourth Day of June, 2024

*Katherine Kelly Vidal*

Katherine Kelly Vidal
*Director of the United States Patent and Trademark Office*